United States Patent
Tate, Jr. et al.

(10) Patent No.: US 9,057,621 B2
(45) Date of Patent: Jun. 16, 2015

(54) NAVIGATION SYSTEM AND METHOD OF USING VEHICLE STATE INFORMATION FOR ROUTE MODELING

(75) Inventors: Edward D. Tate, Jr., Grand Blanc, MI (US); Scott E. Jackson, Northville, MI (US); Todd E. Damon, Phoenix, AZ (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/004,344

(22) Filed: Jan. 11, 2011

(65) Prior Publication Data
US 2012/0179315 A1    Jul. 12, 2012

(51) Int. Cl.
| | | |
|---|---|---|
| *G01C 21/00* | (2006.01) | |
| *G06F 17/00* | (2006.01) | |
| *G01C 21/34* | (2006.01) | |
| *B60W 20/00* | (2006.01) | |
| *B60L 15/20* | (2006.01) | |

(52) U.S. Cl.
CPC ......... *G01C 21/3469* (2013.01); *B60W 20/106* (2013.01); *B60L 15/2045* (2013.01); *B60L 2240/62* (2013.01); *B60L 2240/64* (2013.01); *B60L 2240/70* (2013.01); *Y02T 90/16* (2013.01); *Y02T 90/161* (2013.01); *Y02T 90/162* (2013.01); *Y02T 10/7283* (2013.01); *Y02T 10/7291* (2013.01)

(58) Field of Classification Search
CPC .... G01C 21/00; G01C 21/34; G01C 21/3453; G01C 21/3469; B60W 20/00; B60W 20/104; B60W 20/106

USPC .................................. 701/400, 410, 527, 533; 340/995.19–995.23, 995.27; 903/903, 903/907, 908, 930, 944, 951

See application file for complete search history.

(56) References Cited

U.S. PATENT DOCUMENTS

| | | | |
|---|---|---|---|
| 5,892,346 A * | 4/1999 | Moroto et al. | 318/587 |
| 6,381,522 B1 * | 4/2002 | Watanabe et al. | 701/22 |
| 6,697,717 B2 * | 2/2004 | Shioda et al. | 701/22 |
| 7,013,205 B1 * | 3/2006 | Hafner et al. | 701/22 |
| 7,539,562 B2 * | 5/2009 | Maguire et al. | 701/22 |
| 7,865,298 B2 * | 1/2011 | Macneille et al. | 701/414 |
| 2005/0228553 A1 * | 10/2005 | Tryon | 701/22 |
| 2005/0278071 A1 | 12/2005 | Durham, III | |
| 2006/0097575 A1 | 5/2006 | Xu et al. | |
| 2006/0278449 A1 * | 12/2006 | Torre-Bueno | 180/65.2 |
| 2007/0208467 A1 * | 9/2007 | Maguire et al. | 701/22 |

(Continued)

*Primary Examiner* — Jack W Keith
*Assistant Examiner* — Chuong P Nguyen
(74) *Attorney, Agent, or Firm* — Quinn Law Group, PLLC

(57) ABSTRACT

A vehicle includes a powertrain controller, an energy storage system (ESS), a traction motor, an electrical device such as an HVAC system and/or auxiliary system, and a navigation system. The navigation system generates a recommended eco-route or other travel route. The navigation system receives vehicle state information including a current powertrain state from the controller and a power load value from the device(s), including a state of charge of the ESS. The vehicle state information is used to select between a charge-depleting and a charge-sustaining costing model. The route is generated using the selected model, and then displayed. The navigation system includes a host machine which selects the model and generates the route, and a display screen for displaying the route. A method for generating the route includes receiving the current powertrain state and power load values, and using the state information to select between the charge-depleting and charge-sustaining models.

15 Claims, 1 Drawing Sheet

(56) References Cited

U.S. PATENT DOCUMENTS

| | | | |
|---|---|---|---|
| 2008/0021628 A1* | 1/2008 | Tryon | 701/99 |
| 2008/0027639 A1* | 1/2008 | Tryon | 701/209 |
| 2008/0051977 A1* | 2/2008 | Tryon | 701/103 |
| 2008/0262667 A1 | 10/2008 | Otabe | |
| 2009/0114463 A1* | 5/2009 | DeVault | 180/65.29 |
| 2009/0192660 A1* | 7/2009 | Tamor et al. | 701/22 |
| 2009/0277701 A1 | 11/2009 | Soma et al. | |
| 2009/0326750 A1 | 12/2009 | Ang | |
| 2010/0131139 A1* | 5/2010 | Sakai et al. | 701/22 |
| 2010/0152937 A1* | 6/2010 | Yamada et al. | 701/22 |
| 2010/0230505 A1 | 9/2010 | Ribadeneira et al. | |
| 2011/0022260 A1* | 1/2011 | Ichikawa | 701/22 |
| 2011/0166732 A1* | 7/2011 | Yu et al. | 701/22 |

* cited by examiner

NAVIGATION SYSTEM AND METHOD OF USING VEHICLE STATE INFORMATION FOR ROUTE MODELING

TECHNICAL FIELD

The present invention relates to a navigation system and a method of using vehicle state information for route modeling.

BACKGROUND

Navigation systems accurately determine a user's present position using global positioning system data. The present position is then displayed to the user on a geocoded map. Mapping data may include topographical and road network information. Such information is typically communicated to the navigation system from a remote geospatial database or accessed from an onboard memory location. From the present position or from another starting point, the navigation system may automatically generate turn-by-turn driving directions to a desired destination. A recommended route is ultimately displayed in the form of a graphical route trace and/or as text- or speech-based driving directions.

Using geospatial data, the navigation system can provide precise driving directions to any location contained in the referenced geospatial database. The driving directions may be tailored to a user's preferences, for example a recommended travel route having the shortest overall distance, or a route which requires the least amount of travel time. Hybrid, battery electric, or extended-range electric vehicle designs that can be propelled using an electric traction motor, and thus with low or zero tailpipe emissions, may also display a route which minimizes the consumption of fossil fuel relative to other routes. Such a route is sometimes referred to as an eco-route.

SUMMARY

A vehicle as set forth herein includes a powertrain controller, at least one electrical device, an electric fraction motor, and a navigation system. The navigation system is in communication with a geospatial database, and is configured for generating a recommended travel route, e.g., an economical/ecological route or eco-route, between a route origin and a route destination using mapping data from the geospatial database. Additionally, the navigation system receives, as a set of vehicle state information, a current powertrain state from the controller and a current power load from the electrical device. The navigation system then selects between a charge-depleting costing model and a charge-sustaining costing model using the vehicle state information, generates the recommended travel route using the selected costing model, and displays the route via a display screen.

The electrical device in one embodiment includes a heating, ventilation, and air conditioning (HVAC) system, and the current power load includes the power load of the HVAC system over the course of a given trip. The electrical device may also include an auxiliary system, e.g., a radio, CD player, DVD player, lights, wipers, etc., with the current power load including the power load of the auxiliary system over the trip.

A navigation system for use in a vehicle includes a host machine and a display screen. The host machine is in communication with a geospatial database, and is configured for generating the route between the origin and destination using mapping data from the geospatial database. The host machine receives, as a set of vehicle state information, a current powertrain state from the controller and a current power load from the electrical device(s). The current powertrain state may include the state of charge of the ESS. The host machine uses the vehicle state information to select between the charge-depleting and the charge-sustaining costing models noted above. The host machine then generates the route via the navigation system using the selected costing model, and displays the route using a display screen.

A method for generating the recommend travel route includes receiving, as part of a set of vehicle state information, a current powertrain state from the powertrain controller, wherein the current powertrain state includes the state of charge of the ESS, and receiving, as another part of the set of vehicle state information, a current power load of the electrical device. The method includes using the vehicle state information to automatically select between the charge-depleting and the charge-sustaining costing models. The route is then generated via the navigation system using the selected costing model, and displayed using a display screen.

The above features and advantages and other features and advantages of the present invention are readily apparent from the following detailed description of the best modes for carrying out the invention when taken in connection with the accompanying drawings.

DESCRIPTION

Figure 1:
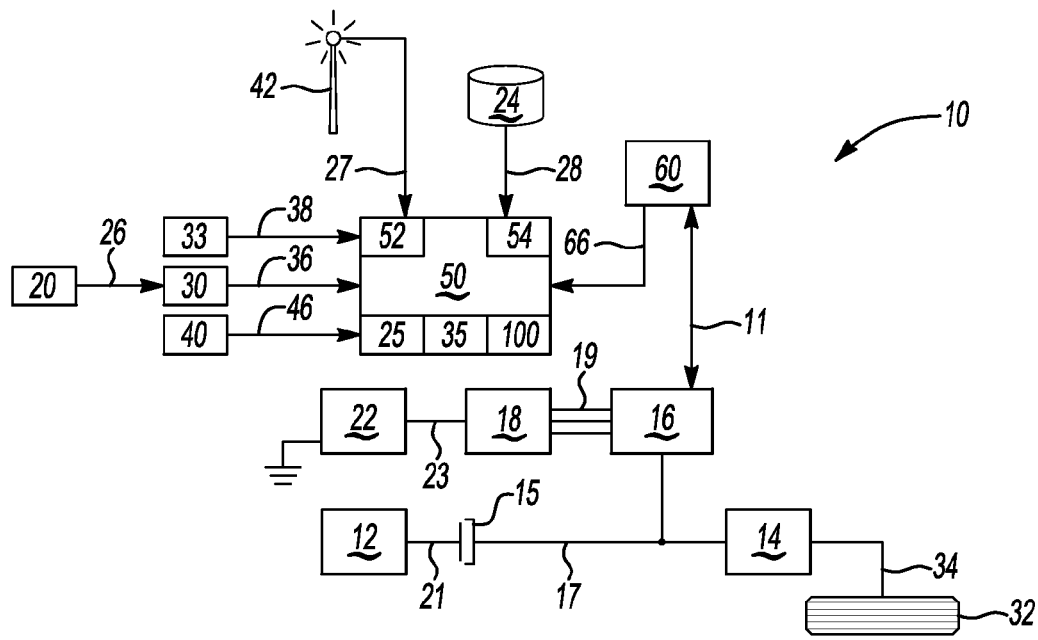
FIG. 1 is a schematic illustration of a vehicle having a navigation system as disclosed herein.

Referring to the drawings wherein like reference numbers correspond to like or similar components throughout the several figures, and beginning with FIG. 1, a vehicle 10 includes a navigation system 50. The navigation system 50 automatically generates and displays a recommended travel route, e.g., an eco-route or other desired route, to a user using one of a plurality of different costing models 25 and 35. The navigation system 50 then selects between the costing models 25 and 35 by processing a collective set of vehicle state information as explained below.

The term "vehicle state information" as used herein refers to the expected energy consumption and to the known and estimated powertrain operating state of the vehicle 10 over a particular travel route or trip. The term "eco-route", as noted above, refers to the generation and display of a recommended travel route that is economically and/or ecologically the most efficient potential route of a plurality of possible routes. Such a route is expected to minimize the rate of fossil fuel consumption by directing a user to routes that extend the electrical-only (EV) range of the vehicle relative to the other possible travel routes.

The present navigation system 50 executes an algorithm 100 to automatically selects between the different costing models 25, 35 before generating and displaying the recommended travel route. The costing models 25, 35 may include a charge-depleting model, i.e., model 25, and a charge-sustaining model, i.e., model 35. As is understood in the art, charge-depleting modes of vehicle travel allow an electrical charge of a battery, such as an energy storage system (ESS) 22 shown in FIG. 1, to be partially or fully depleted over time so as to maximize the duration of EV propulsion. In a charge-depleting mode of travel, the state of charge may be allowed to reach zero or near zero levels before or at the end of a trip. By way of contrast, in a charge-sustaining mode of travel a threshold minimum state of charge is always maintained, e.g., at or above approximately 15-20% of a maximum possible state of charge. Once the lower threshold is reached, the powertrain is controlled in such a way as to generate power for charging the battery.

The navigation system 50 may be embodied as a host machine, for example one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics. While shown as a single device in FIG. 1 for simplicity and clarity, the various elements of the navigation system 50 may be distributed over as many different hardware and software components as are required.

In various embodiments, the vehicle 10 may be configured as a plug-in hybrid or another hybrid electric vehicle, a battery electric vehicle, or an extended range electric vehicle. In the non-limiting illustrative embodiment shown in FIG. 1, the vehicle 10 includes an electric traction motor 16 that provides motor torque to a transmission 14, and the ESS 22, e.g., a multi-cell rechargeable battery. A power inverter module (PIM) 18 may be electrically connected between the ESS 22 and the traction motor 16 via a high-voltage AC bus 19, and used to convert AC power from the motor to DC power for storage in the ESS and vice versa. A high-voltage DC bus 23 may be electrically connected between the PIM 18 and the ESS 22. A DC-DC power converter (not shown) may also be used as needed to increase or decrease the level of DC power to a level suitable for use by various DC-powered vehicle systems.

When it is configured as a hybrid electric vehicle, the vehicle 10 includes an internal combustion engine 12 that selectively generates engine torque via an engine output shaft 21. Torque from the engine output shaft 21 can be used to either directly drive a transmission input member 17, and thus to propel the vehicle 10, e.g., in a hybrid electric vehicle design, or to power an electric generator (not shown) in an extended-range electric vehicle design. An input clutch and damper assembly 15 may be used to selectively connect/disconnect the engine 12 from the transmission 14, and to damp any oscillations during the connection/disconnection process. Input torque is ultimately transmitted from the traction motor 16 and/or the engine 12 to a set of drive wheels 32 via an output member 34 of the transmission 14.

The vehicle 10 further includes a user interface 20, a heating, ventilation, and air conditioning (HVAC) system 30, various auxiliary systems 40, and a powertrain controller 60. Each of these devices provides a corresponding signal to the navigation system 50 for use in selecting between the charge-depleting model 25 and the charge-sustaining model 35 during vehicle operation.

The controller 60 in one possible embodiment may be a hybrid control processor used aboard a hybrid electric vehicle. In this embodiment, the controller 60 may coordinate torque input to the transmission 14 from the engine 12 and the traction motor 16 using feedback and control signals (double arrow 11). The controller 60 in turn provides signals to the navigation system 50 in the form of a current powertrain state (arrow 66). The powertrain state (arrow 66) may also include information such as the remaining energy or state of charge of the ESS 22, whether the transmission 14 is in a fixed gear mode, an EV mode, an electrically variable transmission (EVT) mode, etc.

The HVAC system 30 receives user settings (arrow 26) from the user interface 20, such as various desired HVAC settings. For example, an occupant of the vehicle 10 can select a desired temperature and blower speed using a keypad or a dial portion of the user interface 20, such as is typically present on an instrument panel or center console of a vehicle interior. The physical settings are then communicated to the HVAC system 30 as the user settings (arrow 26). The navigation system 30 may estimate the power load of the HVAC system 30 as a function of the user settings (arrow 26) in one embodiment. The HVAC load (arrow 36), whether the current or an estimated power load of the HVAC system 30, is then communicated to the navigation system 50 as an additional input.

The auxiliary systems 40 can include various other electrically powered non-HVAC systems and components used aboard the vehicle 10. Such systems may include, by way of example, a radio, a DVD and/or CD player, wipers, lights, etc., with the various auxiliary systems 40 collectively presenting an auxiliary load (arrow 46). The auxiliary load (arrow 46) is used an additional input to the navigation system 50. The various inputs, i.e., the powertrain state (arrow 66), the HVAC load (arrow 36), and the auxiliary load (arrow 46), collectively define the vehicle state information that is ultimately used by the navigation system 50. The navigation system 50 uses this information to automatically select between the charge-depleting model 25 and the charge-sustaining model 35 in generating and displaying a recommended travel route, as set forth below.

Still referring to FIG. 1, the navigation system 50 is in communication with a remote source 42 and a geospatial database 24. From the remote source 42, the navigation system 50 can receive external information (arrow 27), e.g., traffic, weather, and/or construction updates. Such information may also be used by the navigation system 50 in determining the eco-route. From the geospatial database 24, the navigation system 50 can also receive geospatial information (arrow 28) for use in generating the map for display. As used herein, the term "geospatial database" refers to a geographic information system containing geospatial data of multiple contiguous locations. The geospatial database 24 may be remotely located with respect to the navigation system 50 as shown, with the geospatial information (arrow 28) being accessible by the navigation system using a transmitter/receiver (not shown). When the geospatial database 24 is local, e.g., stored on tangible media as mapping software and accessed directly by associated hardware components of the navigation system, the geospatial database may be positioned aboard the vehicle 10.

The navigation system 50 displays a recommended travel route to a user via a display screen 52. The display screen 52 may graphically or visually display the recommended travel route via a graphical route/map trace and/or text-based driving directions, and/or may be further configured with an audio speaker 54 that broadcasts turn-by-turn driving directions as audible speech. Additional input data (arrow 38) to the navigation system 50 may include route origin and route destination, which may be entered via an input device 33 such as a touch screen as shown. Alternatively, the display screen 52, the user interface 20, and the input device 33 may be embodied as an integrated device, such as a single touch-screen capable of detecting and recording the input data 38 and the user setting (arrow 26) by detecting a touch of the user's hand or a stylus.

The navigation system 50 thus automatically executes the algorithm 100 to automatically select between the costing models 25 and 35 using vehicle state information, as collectively represented by arrows 36, 38, 46, and 66 in FIG. 1, as well as the input data (arrow 38), the geospatial information (arrow 28) from the geospatial database 24, and any external information (arrow 27) from the remote source 42, as needed.

Figure 2:
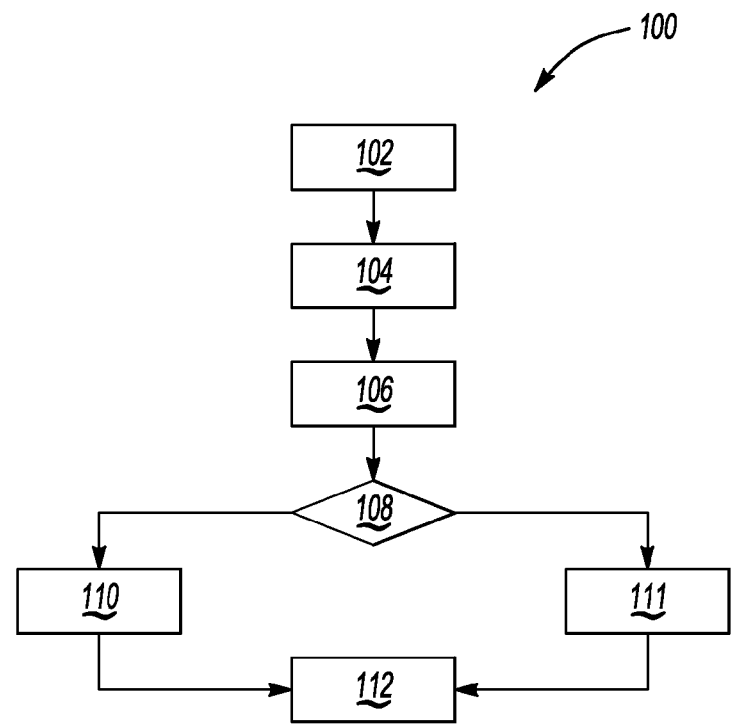
FIG. 2 is a flow chart describing an algorithm or process that is executable via the navigation system of FIG. 1.

Referring to FIG. 2, use of the algorithm 100 improves vehicle routing capability by fine tuning the routing using actual vehicle operating conditions. For example, in a plug-in hybrid or extended-range electric vehicle design, the energy costs of traveling in a charge-depleting mode of operation can differ, sometimes substantially, from traveling in a charge-sustaining mode of operation. Using a single "one size fits all" energy cost model without properly considering estimated energy consumption may reduce the benefits of eco-routing. Likewise, in a battery electric or extended-range electric vehicle, HVAC electrical loads may be comparable to the electrical load required for vehicle propulsion. Thus, the navigation system 50 disclosed herein considers the collective set of vehicle state information and selects between the different cost models, i.e., the charge-depleting model 25 and the charge-sustaining model 35 of FIG. 1.

One possible embodiment of the algorithm 100 begins with step 102, wherein the navigation system 50 of FIG. 1 records the origin and destination of a desired trip, via the input device 33, and then initially determines the expected power load for the duration of that particular trip. Step 102 may entail directly measuring energy consumption, e.g., of the HVAC system 30, the auxiliary system 40, or another electrical device or devices during the trip in real time, or by estimating power consumption over the duration of the trip using the user settings (arrow 26) determined via the user interface 20 and/or from ambient temperature or other ambient conditions.

At step 104, the navigation system 50 may estimate a remaining charge-depleting range of the vehicle 10 using the vehicle state information. For example, the navigation system 50 may receive the current state of charge of the ESS 22 from the powertrain controller 60, and then estimate the charge-depleting range based on the state of charge and the estimated power consumption of the HVAC system 30 determined at step 102. Other values such as the auxiliary load (arrow 46) may also be considered. Step 104 may entail determining the locations, via the database 24 of FIG. 1 or otherwise, of electrical charging stations or fuel stations. When this is done, the navigation system 50 may update the estimated range using this information. Once the remaining range has been estimated, the algorithm 100 proceeds to step 106.

At step 106, the navigation system 50 estimates the minimum route distance using the entered origin and destination, HVAC power consumption, and the remaining range from steps 102 and 104. The algorithm 100 proceeds to step 108 once the minimum route distance has been estimated.

At step 108, the navigation system 50 of FIG. 1 determines whether the minimum route distance determined at step 106 is suitable for a charge depleting operation, i.e., is less than the effective remaining range of the ESS 22. If so, the algorithm 100 proceeds to step 110, otherwise the algorithm proceeds to step 111.

At step 110, the navigation system 50 selects the charge-depleting model 25 shown in FIG. 1, and initiates execution of that model before proceeding to step 112.

At step 111, the navigation system 50 selects the charge-sustaining model 35, and initiates execution of that model. The algorithm 100 proceeds to step 112.

At step 112, the navigation system 50 calculates a recommended eco-route or other recommended travel route and other associated information, as desired, using either the charge-depleting model 25 or the charge-sustaining model 35, as determined above in steps 110 and 111, respectively.

The particular model 25 or 35 that is executed has parameters including at least one of the powertrain operating state, the current power load of the HVAC system 30 and/or the auxiliary system 40, as noted above. In one embodiment, all three are used as inputs, and are set prior to creating the route. The inclusion of additional vehicle state information thus improves the accuracy of vehicle routing by ensuring that the recommended routes do not consume extra energy due to inaccurate estimates from a non-optimal routing model. The recommended travel route is then displayed via the display screen 52. Other information may be displayed as well, e.g., an estimate of a rate of energy use per mile driven, to provide additional information to the driver.

While the best modes for carrying out the invention have been described in detail, those familiar with the art to which this invention relates will recognize various alternative designs and embodiments for practicing the invention within the scope of the appended claims.

The invention claimed is:
1. A vehicle comprising:
a powertrain controller;
an energy storage system (ESS) having a maximum state of charge (SOC);
a traction motor that is energized via the ESS, and that is configured to propel the vehicle;
at least one electrical device, including a heating, ventilation, and air conditioning (HVAC) system and an auxiliary system; and
a navigation system in communication with a geospatial database, and configured to generate a recommended travel route for a trip between a route origin and a route destination using mapping data from the geospatial database, wherein the navigation system includes a display screen;
wherein the navigation system is configured to:
receive, as vehicle state information, a current powertrain state from the powertrain controller and a current power load from the at least one electrical device, wherein the current powertrain state includes a state of charge of the ESS;
determine an expected power load for a duration of the trip using the current power load;
estimate a remaining charge depleting range of the vehicle using the vehicle state information and the expected power load;
estimate a minimum route distance for the trip using the route origin, the route destination, the expected power load, and the estimated remaining charge depleting range;
select, using the vehicle state information, a charge-depleting costing model when the minimum route distance is less than the estimated remaining charge depleting range, wherein the charge-depleting costing model uses the traction motor in a manner that depletes the ESS substantially below a calibrated threshold state of charge of at least 15% of the maximum state of charge of the ESS;
select, using the vehicle state information, a charge-sustaining costing model that uses the traction motor in a manner that maintains the state of charge of the ESS above the calibrated threshold state of charge when the minimum route distance is greater than the estimated remaining charge depleting range;
generate the recommended travel route via the navigation system using the selected charge-deleting or charge-sustaining costing model; and display the recommended travel route via the display screen.

2. The vehicle of claim 1, wherein the electrical device further includes an auxiliary system, and wherein the current power load includes the power load of the auxiliary system.

3. The vehicle of claim 1, further comprising a user interface configured for recording user settings for the HVAC system, wherein the navigation system processes the user settings to thereby determine the power load of the HVAC system.

4. The vehicle of claim 1, further comprising an internal combustion engine and a transmission, wherein the powertrain controller is a hybrid control processor configured for coordinating torque input to the transmission from the engine and the traction motor.

5. The vehicle of claim 1, wherein the navigation system is in communication with a remote source that provides weather and traffic information as at least part of the vehicle state information.

6. The vehicle of claim 1, wherein the navigation system is further configured to:
  select the charge-depleting costing model only if the estimated minimum route distance is less than the estimated remaining charge-depleting range.

7. A navigation system for use in a vehicle having a powertrain controller, an energy storage system (ESS) having a maximum state of charge, a traction motor powered by the ESS, and at least one electrical device including a heating, ventilation, and air conditioning (HVAC) system and an auxiliary system, the navigation system comprising:
  a host machine in communication with a geospatial database, and configured for generating a recommended travel route for a trip between a route origin and a route destination using mapping data from the geospatial database; and
  a display screen;
  wherein the host machine is configured to:
    receive, as vehicle state information, a current powertrain state from the powertrain controller and a current power load from the at least one electrical device, including a power load of the HVAC system, wherein the current powertrain state includes the state of charge of the ESS;
    determine an expected power load for a duration of the trip using the current power load;
    estimate a remaining charge depleting range of the vehicle using the vehicle state information and the expected power load;
    estimate a minimum route distance for the trip using the route origin, the route destination, the expected power load, and the estimated remaining charge depleting range;
    select, using the vehicle state information, a charge-depleting costing model when the minimum route distance is less than the estimated remaining charge depleting range, wherein the charge-depleting costing model, uses the traction motor in a manner that depletes the ESS substantially below a calibrated threshold state of charge
    select, using the vehicle state information, a charge-sustaining costing model that uses the traction motor in a manner that maintains the state of charge of the ESS above the calibrated threshold state of charge when the minimum route distance is greater than the estimated remaining charge depleting range, wherein the calibrated threshold state of charge is above 15% of the maximum state of charge;
    generate the recommended travel route via the navigation system using the selected charge-depleting or charge-sustaining costing model; and
    display the recommended travel route via the display screen.

8. The navigation system of claim 7, further comprising a user interface configured for recording user settings for the HVAC system, wherein the navigation system processes the user settings to thereby estimate the power load of the HVAC system.

9. The navigation system of claim 7, wherein the vehicle further includes an internal combustion engine and a transmission, and wherein the powertrain controller is a hybrid control processor configured for coordinating torque input to the transmission from the engine and the traction motor.

10. The navigation system of claim 7, wherein the navigation system is in communication with a remote source that provides weather and traffic information as at least part of the vehicle state information.

11. The navigation system of claim 7, wherein the host machine is configured to:
  select the charge-depleting costing model only if the estimated minimum route distance is less than the estimated remaining charge-depleting range.

12. A method for generating a recommended travel route for a trip between a route origin and a route destination using a navigation system having a display screen in a vehicle, wherein the vehicle includes a powertrain controller, a traction motor, an electrical storage system (ESS) having a maximum state of charge and supplying power to the traction motor, and an electrical device, the method comprising:
  receiving, via the navigation system, the route origin and the route destination for the trip;
  receiving via the navigation system, as part of a set of vehicle state information, a current powertrain state from the powertrain controller, wherein the current powertrain state includes the state of charge of the ESS;
  receiving via the navigation system, as another part of the set of vehicle state information, a power load value from the electrical device, including receiving a power load from a heating, ventilation, and air conditioning (HVAC) system and a heating, ventilation, and air conditioning (HVAC) system and from an auxiliary system;
  determining an expected power load for a duration of the trip using the current power load;
  estimating a remaining charge depleting range of the vehicle using the vehicle state information and the expected power load;
  estimating a minimum route distance for the trip using the route origin, the route destination, the expected power load, and the estimated remaining charge depleting range;
  using the vehicle state information to automatically select between a charge-depleting costing model that uses the traction motor when the minimum route distance is less than the estimated remaining charge depleting range, wherein the charge-depleting costing model depletes the ESS substantially below a calibrated threshold state of charge, and a charge-sustaining costing model that uses the traction motor in a manner that maintains the state of charge of the ESS above the calibrated threshold state of charge when the minimum route distance is greater than the estimated remaining charge depleting range, wherein the calibrated threshold state of charge is above 15% of the maximum state of charge;

generating the recommended travel route, via the navigation system, using the selected charge-depleting or charge-sustaining costing model; and displaying the recommended travel route using the display screen.

13. The method of claim 12, further comprising:

using a user interface to record user settings for the HVAC system; and processing the user settings using the navigation system to thereby estimate a power load of the HVAC system.

14. The method of claim 12, further comprising generating and displaying, via the display screen, at least one of:

an estimated remaining range of the vehicle until a recharge or a refill; and an estimate of a rate of energy use per mile driven.

15. The method of claim 12, further comprising:

selecting the charge-depleting costing model only if the estimated minimum route distance is less than the estimated remaining charge-depleting range.

* * * * *